(12) United States Patent
Hoch et al.

(10) Patent No.: US 11,163,406 B2
(45) Date of Patent: Nov. 2, 2021

(54) EXCITATION SCHEMES FOR AN INPUT DEVICE

(71) Applicant: SYNAPTICS INCORPORATED, San Jose, CA (US)

(72) Inventors: David Hoch, Los Gatos, CA (US); Guozhong Shen, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 14 days.

(21) Appl. No.: 16/744,483

(22) Filed: Jan. 16, 2020

(65) Prior Publication Data

US 2021/0223907 A1 Jul. 22, 2021

(51) Int. Cl.
*G06F 3/044* (2006.01)
*G06F 3/0362* (2013.01)
*G06F 3/041* (2006.01)

(52) U.S. Cl.
CPC .......... *G06F 3/0441* (2019.05); *G06F 3/0362* (2013.01); *G06F 3/0416* (2013.01); *G06F 3/0446* (2019.05); *G06F 2203/04107* (2013.01)

(58) Field of Classification Search
CPC ...... G06F 3/041; G06F 3/0446; G06F 3/0362; G06F 3/0416; G06F 2203/04107
See application file for complete search history.

(56) References Cited

U.S. PATENT DOCUMENTS

2017/0364184 A1* 12/2017 Weinerth .............. G06F 3/0442

* cited by examiner

*Primary Examiner* — Lisa S Landis
(74) *Attorney, Agent, or Firm* — Leydig, Voit & Mayer, Ltd.

(57) ABSTRACT

A system and method for capacitive sensing comprises driving a first sensor electrode of a plurality of sensor electrodes with a first sensing signal to acquire a first resulting signal with the first sensor electrode during a period and driving a second sensor electrode of the plurality of sensor electrodes with the first sensing signal to acquire a second resulting signal with the second sensor electrode during the period. Further, a third sensor electrode of the plurality of sensor electrodes is driven with a reference signal during the period. Rotational information for an input object is determined at least partially based on the first resulting signal and the second resulting signal.

20 Claims, 9 Drawing Sheets

EXCITATION SCHEMES FOR AN INPUT DEVICE

BACKGROUND

Field

The disclosure herein is generally related to electronic devices, and more specifically, to operating sensing devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one embodiment, a processing system comprises a sensor module and a determination module. The sensor module comprises sensor circuitry and is coupled to a plurality of sensor electrodes. The sensor module is configured to drive a first sensor electrode of the plurality of sensor electrodes with a first sensing signal to acquire a first resulting signal with the first sensor electrode during a period, and drive a second sensor electrode of the plurality of sensor electrodes with the first sensing signal to acquire a second resulting signal with the second sensor electrode during the period. Further, the sensor module is configured to drive a third sensor electrode of the plurality of sensor electrodes the plurality of sensor electrodes with a reference signal during the period. The third sensor electrode is capacitively coupled with an electrode of an input object. The determination module is configured to determine rotational information for the input object at least partially based on the first resulting signal and the second resulting signal.

In one or more embodiments, a method for capacitive sensing comprises driving a first sensor electrode of a plurality of sensor electrodes with a first sensing signal to acquire a first resulting signal with the first sensor electrode during a period and driving a second sensor electrode of the plurality of sensor electrodes with the first sensing signal to acquire a second resulting signal with the second sensor electrode during the period. The method further comprises driving a third sensor electrode of the plurality of sensor electrodes with a reference signal during the period, and determining rotational information for an input object at least partially based on the first resulting signal and the second resulting signal.

In one embodiment, an input device comprises a plurality of sensor electrodes, and a processing system coupled to the plurality of sensor electrodes. The processing system is configured to drive a first sensor electrode of the plurality of sensor electrodes with a first sensing signal to acquire a first resulting signal with the first sensor electrode during a period and drive a second sensor electrode of the plurality of sensor electrodes with the first sensing signal to acquire a second resulting signal with the second sensor electrode during the period. The processing system is further configured to drive a third sensor electrode of the plurality of sensor electrodes with a reference signal during the period and determine rotational information for an input object at least partially based on the first resulting signal and the second resulting signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
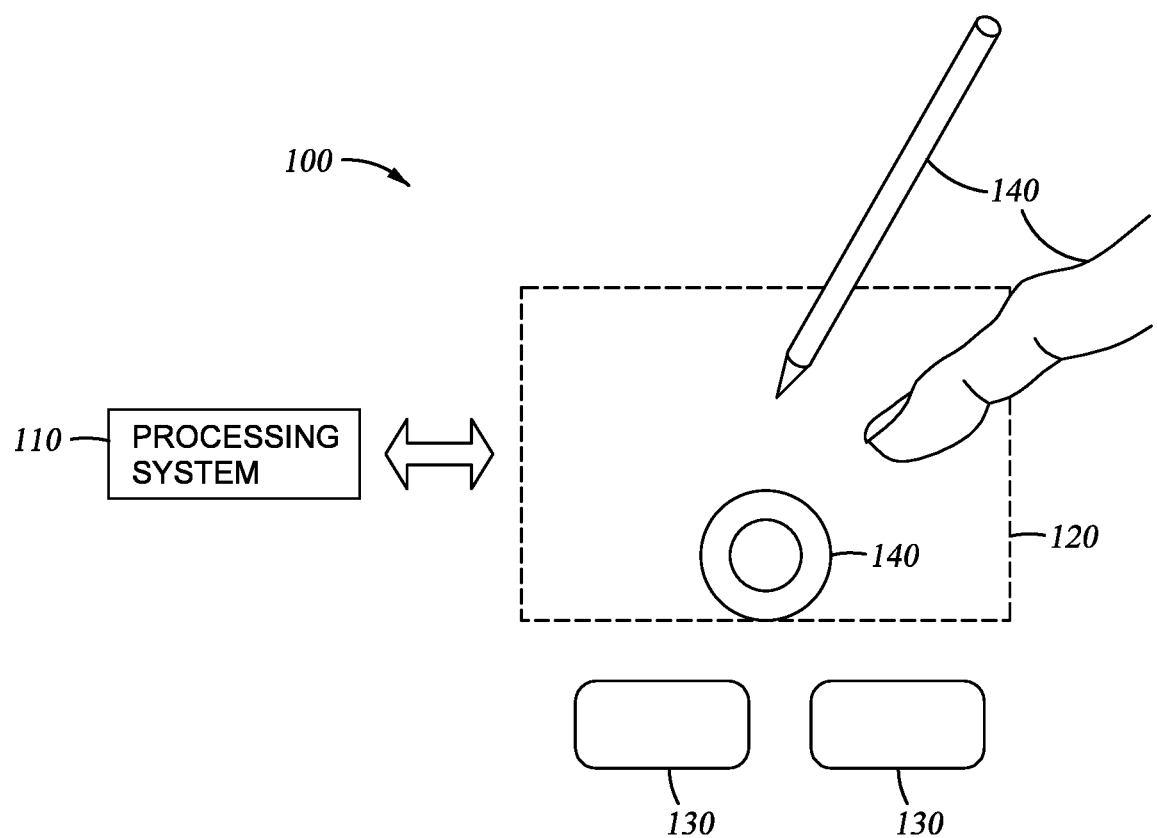
FIG. 1 is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Rotatable input objects (e.g., rotatable knobs) may be used to interact with input devices. The rotatable input objects may include one or more electrodes that alter the capacitance of the sensor electrodes of an input device. For example, as the electrodes of a rotatable input object are moved over the sensor electrodes of an input device, the electrodes of the rotatable input object alter the capacitance of the sensor electrodes. Further, as the electrodes of the rotatable input object are not actively driven; the electrical potential of the electrodes of the rotatable input object corresponds to the electrical potential of the sensor electrode of an input device overlapped by the rotatable input object. However, during operation, the electrodes of the rotatable input object are moved over the sensor electrodes of the input device having different electrical potentials. Thus, the electrical potential of electrodes of the rotatable input object changes as the rotatable input object is moved. Accordingly, the changes in capacitance caused by the electrodes of the rotatable input object differ as the rotatable input object is moved. In the following description various methods to mitigate the changes in the electrical potential of the electrodes of the rotatable input device are described.

The following detailed description is merely exemplary in nature and is not intended to limit the disclosure or the application and uses of the disclosure. Furthermore, there is no intention to be bound by any expressed or implied theory presented in the preceding background, summary, or the following detailed description.

An example input device 100 as shown in FIG. 1 in accordance with embodiments of the disclosure may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and Infrared Data Association (IrDA) protocols.

In FIG. 1, the input device 100 is shown as a proximity sensor device configured to sense input provided by one or more input objects 140 in a sensing region 120. Example input objects 140 include fingers, styli, and a rotatable input object (e.g., a knob) as shown in FIG. 1. An exemplary proximity sensor device may be a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g., a touch surface, of the input device 100; contact with an input surface of the input device 100 coupled with some amount of applied force or pressure; and/or a combination thereof. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations sensing elements may be formed of a substantially transparent metal mesh (e.g., a reflective or absorbing metallic film patterned to minimize visible transmission loss from the display subpixels). Further, the sensor electrodes may be disposed over a display of a display device. The sensing electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material. Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more embodiments, the first and second groups may be orthogonal axes to each other. Further, in various embodiments, the absolute capacitance measurement may comprise a profile of the input object couplings accumulated along one axis and projected onto the other. In various embodiments, an input object (e.g., a powered active stylus) may be received by the orthogonal electrode axes without modulation of the corresponding electrodes (e.g., relative to a system ground). In such an embodiment, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100. The processing system 110 may be configured to operate the hardware of the input device 100 to detect input in the sensing region 120. The processing system 110 may comprise parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate from one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g., a mobile device application processor or any other central processing unit) of the phone. In some embodiments, the processing system 110 is dedicated to implementing the input device 100. In other embodiments, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for finite impulse response (FIR) digital filtering or infinite impulse response (IIR) switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and/or any proximate conductive object. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes (e.g., ITO, metal mesh, etc.) overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
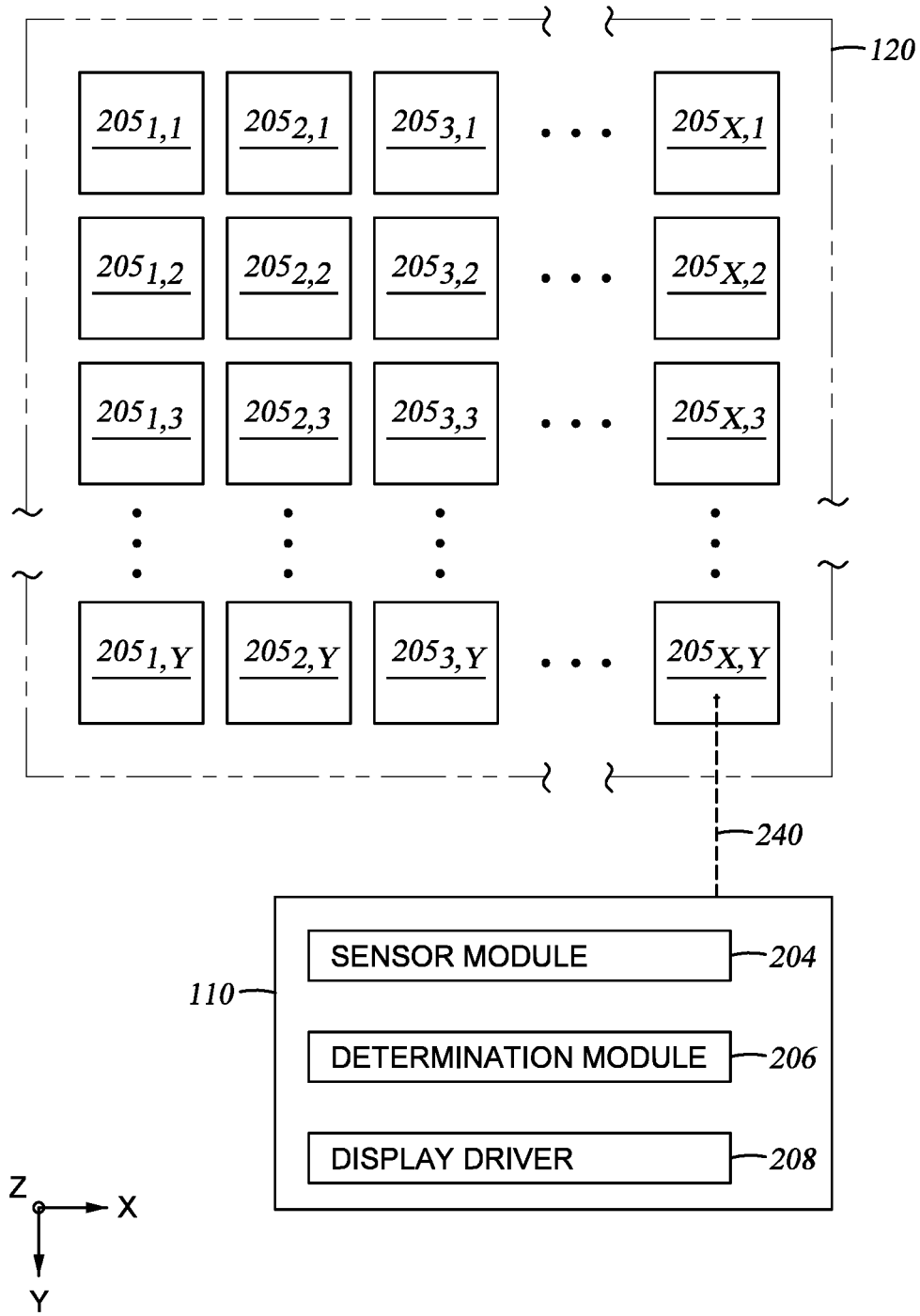
FIG. 2 illustrates an example input device, according to one or more embodiments.

FIG. 2 shows a portion of an exemplary pattern of sensor electrodes 205 configured to sense in the sensing region 120 associated with a pattern, according to some embodiments. Each sensor electrode 205 may include one of more of the sensing elements described above. For clarity of illustration and description, FIG. 2 presents the regions of the sensor electrodes 205 in a pattern of simple rectangles and does not show various other components connected to or within the sensor electrodes 205. In one embodiment, the sensor electrodes 205 forms areas of localized capacitance of corresponding capacitive sensing pixels, or capacitive pixels. Capacitive sensing pixels may be formed between an individual sensor electrode 205 and ground when the sensor electrodes 205 are operated for absolute capacitive sensing. Further, the capacitive sensing pixels may be formed between groups of sensor electrodes 205 used as transmitter and receiver electrodes when the sensor electrodes 205 are operated for transcapacitive sensing. The capacitance between the sensor electrodes 205 and ground and/or between the sensor electrodes 205 changes with the proximity and motion of input objects in the sensing region 120, and thus may be used as an indicator of the presence of the input object 140 in the sensing region 120 and to determine positional information of an input object 140.

The exemplary pattern comprises an array of sensor electrodes 205$X,Y$ (referred collectively as sensor electrodes 205) arranged in X columns and Y rows in a common plane, wherein X and Y are positive integers, although one of X and Y may be zero. It is contemplated that the pattern of sensor electrodes 205 may comprise a plurality of sensor electrodes 205 having other configurations, such as polar arrays, repeating patterns, non-repeating patterns, non-uniform arrays, a single row or column, or other suitable arrangement. Further, as will be discussed in more detail below, the sensor electrodes 205 may be any shape such as circular, rectangular, diamond, star, square, noncovex, convex, non-concave concave, etc. As shown here, the sensor electrodes 205 are coupled to the processing system 110 and utilized to determine the presence of (or lack thereof) and positional information of an input object, e.g., the input object 140, in the sensing region 120.

The sensor electrodes 205 are ohmically isolated from each other. That is, one or more insulators separate the sensor electrodes and prevent them from electrically shorting to each other.

In various embodiments, the sensor electrodes 205 are coupled to the processing system 110 via traces 240. In one embodiment, each sensor electrode 205 is coupled to the processing system 110 via a respective one of the traces 240. In one or more embodiments, the traces 240 may couple the sensor electrodes 205 with the sensor module 204 and/or the display driver 208.

In a first mode of operation, at least one sensor electrode 205 may be utilized to detect the presence of the input object 140 and positional information of the input object 140 via absolute sensing techniques. A sensor module 204 in the processing system 110 is configured to drive the sensor electrodes 205 using traces 240 with an absolute capacitive sensing signal and acquire resulting signals from the sensor electrodes 205 to perform absolute capacitive sensing. Further, a determination module 206 may receive the resulting signals from the sensor module 204 to determine changes in absolute capacitive coupling for the sensor electrodes 205. Further, the determination module 206 determines positional information of the input object 140 based on the changes in absolute capacitive sensing.

In a second mode of operation, sensor electrodes 205 are utilized to detect the presence of the input object 140 via transcapacitance sensing techniques. That is, the sensor module 204 may drive a first at least one sensor electrode 205 with a transcapacitive sensing signal via respective traces 240 and receive resulting signals using a second at least one sensor electrode 205 via respective traces 240. The resulting signals comprising effects corresponding to the transcapacitive sensing signal. The resulting signals are provided to the determination module 206 from the sensor module 204 to determine changes in transcapacitive coupling for the sensor electrodes 205. Further, the determination module 206 determines positional information of the input object 140 based on the transcapacitive coupling. The sensor electrodes that are driven with the transcapacitive signal are modulated relative to the sensor electrodes that receive the resulting signals. In one embodiment, both the sensor electrodes that are driven with the transmitter signal and the sensor electrodes that receive the resulting signals are modulated. Further, in another embodiment, the receiver electrodes are driven with a constant voltage signal while the transmitter electrodes driven with the transcapacitive sensing signal are modulated.

The input device 100 may be configured to operate in either of the modes described above. The input device 100 may also be configured to switch between the two modes described above.

In some embodiments, the sensor electrodes 205 are "scanned" to acquire the resulting signals. That is, one or more of the sensor electrodes 205 are driven with transcapacitive sensing signals. In one embodiment, one sensor electrode 205 may be driven with a transcapacitive sensing signal at one time. Alternatively, multiple sensor electrodes 205 may be driven with transcapacitive sensing signals at the same time. In such an embodiment, the sensor electrodes 205 are driven with the transcapacitive sensing signals simultaneously. In one implementation, two or more of the sensor electrodes 205 may be driven with the same transcapacitive sensing signal. In such an implementation, driving two or more of the sensor electrodes 205 effectively produces a larger sensor electrode. In an alternative implementation, a first one or more of the sensor electrodes 205 may be driven with a first transcapacitive sensing signal and a second one or more of the sensor electrodes may be driven with a second transcapacitive sensing signal, the first and second transcapacitive sensing signals being different from each other. Further, the first and second transcapacitive sensing signals may be based on different ones of a plurality of digital codes that enable the combined effects on the resulting signals of receiver electrodes to be independently determined.

The sensor electrodes configured as receiver sensor electrodes may be operated individually or together (e.g., in subsets, totality, or various combinations) to acquire resulting signals. The resulting signals may be used to determine measurements of the capacitive couplings of the sensor electrode 205.

In other embodiments, "scanning" the sensor electrodes 205 includes driving with an absolute capacitive sensing signal and measuring the absolute capacitance of one or more of the sensor electrodes 205. The absolute capacitive sensing may be driven on one or more of the sensor electrodes 205 at the same time. In such embodiments, an absolute capacitive measurement may be obtained from each of the driven sensor electrodes 205 simultaneously. In one embodiment, a first one or more of the sensor electrodes 205 may be driven with absolute capacitive sensing signals during a first period and a second one or more of the sensor electrodes may be driven with absolute capacitive sensing signals during a second period. The first period and the second period may be at least partially overlapping or non-overlapping. In another embodiment, each of the sensor electrodes 205 may be simultaneously driven during the same period.

In various embodiments, processing system 110 may be configured to selectively drive and receive with a portion of the sensor electrodes. For example, the sensor electrodes utilized to perform absolute capacitive sensing and/or transcapacitive sensing may be selected based on, but not limited to, an application running on the host processor, a status of the input device, an operating mode of the sensing device and a determined location of an input device. The host processor may be central processing unit or any other processor of an electronic device.

A set of measurements determined from the resulting signals received from the sensor electrodes 205 may be utilized by the determination module 206 to form a capacitive image. Further, the resulting signals may be received during a capacitive frame. A capacitive frame may correspond to one or more capacitive images. Multiple capacitive images may be acquired over multiple time periods, and differences between them used to derive information about an input device in the sensing region 120. For example, successive capacitive images acquired over successive periods of time can be used to track the motion(s) of one or more input objects entering, exiting, and within the sensing region.

In some embodiments, one or more of the sensor electrodes 205 include one or more display electrodes used in updating the display of the display screen. In one or more embodiment, the display electrodes comprise one or more segments of a common voltage electrode, also referred to as a Vcom electrode, a source electrode, gate electrode, an anode electrode or cathode electrode, among others. These display electrodes may be disposed on an appropriate display screen substrate. For example, in display screens such as In Plane Switching (IPS) and Plane to Line Switching (PLS) Organic Light Emitting Diode (OLED), the display electrodes may be disposed on a transparent substrate, e.g., a glass substrate, TFT glass, or any other transparent material). In other embodiments, in display screens such as Patterned Vertical Alignment (PVA) and Multi-domain Vertical Alignment (MVA), the display electrodes may be disposed on the bottom of a color filter glass. In such embodiments, an electrode that is used as both a sensor electrode and a display electrode can also be referred to as a combination electrode, since it performs multiple functions.

Continuing to refer to FIG. 2, in various embodiments, the processing system 110 coupled to the sensing electrodes includes the sensor module 204 and the determination module 206. Further, the processing system 110 may additionally include a display driver 208. In one embodiment, the sensor module 204 comprises sensor circuitry configured to drive the transcapacitive sensing signals and the absolute capacitive sensing signal onto the sensor electrodes 205 and receive resulting signals with the sensor electrodes 205 during periods in which input sensing is desired.

The sensor module 204 comprises a transmitter circuitry configured to drive a transcapacitive sensing signal and/or an absolute capacitive sensing signal onto the sensor electrodes 205 during periods in which input sensing is desired. The transcapacitive sensing signal and the absolute capacitive sensing signal is modulated and contains one or more sensing bursts in one or more sensing cycles over a period of time allocated for input sensing. The transcapacitive sensing signal and the absolute capacitive sensing signal may have an amplitude, frequency and voltage. Further, the transcapacitive sensing signal and the absolute capacitive sensing signal may be varying voltage signals that modulate between two or more voltages. The absolute capacitive sensing signal may be the same or different from the transcapacitive sensing signal used in transcapacitance sensing. The sensor module 204 may be selectively coupled to one or more of the sensor electrodes 205. For example, the sensor module 204 may be coupled to selected portions of the sensor electrodes 205 and operate in either an absolute or transcapacitance sensing mode. In another example, the sensor module 204 may be coupled to different sensor electrodes when operating in the absolute sensing mode than when operating in the transcapacitance sensing mode.

In various embodiments, the sensor module 204 comprises receiver circuitry configured to receive a resulting signal with the sensing electrodes comprising effects corresponding to the transmitter signal during periods in which input sensing is desired. In one or more embodiments, the sensor module 204 is configured to receive a resulting signal from a sensor electrode that is driven with an absolute capacitive sensing signal to determine changes in absolute capacitance between the sensor electrode and an input object. In one or more embodiments, the sensor module 204 determines a position of the input object in the sensing region 120. In one or more embodiments, the sensor module 204 provides a signal including information indicative of the resulting signal to another module or processor such as a determination module 206 of the processing system 110 or a processor of the electronic device, e.g., a host processor, for determining the positional information of the input object 140 in the sensing region 120. In one or more embodiments, the sensor module 204 comprises a plurality of receivers, where each receiver may be an analog front end (AFE).

The display driver 208 includes display driver circuitry configured to drive display electrodes to update a display. For example, the display driver 208 may drive display update signals on the display electrodes during non-sensing periods, e.g., display updating periods. The display driver 208 may include source driver circuitry configured to drive source electrodes of a display device for display updating. The display driver 208 may be included with or separate from the sensor module 204. In one embodiment, the processing system 110 comprises a first IC chip comprising the display driver 208 and at least a portion of the sensor module 204. In such embodiments, an IC chip comprising both the display driver 208 and at least a portion of the sensor module 204 may be referred to as comprising touch and display driver integration (TDDI) technology. In another embodiment, the processing system 110 comprises a first integrated controller comprising the display driver 208 and a second integrated controller comprising at least a portion of the sensor module 204.

In one or more embodiments, capacitive sensing or input sensing and display updating may occur during at least partially overlapping periods. For example, as a display electrode is driven for display updating, the display electrode may also be driven for capacitive sensing. Overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time duration as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

Figure 3:
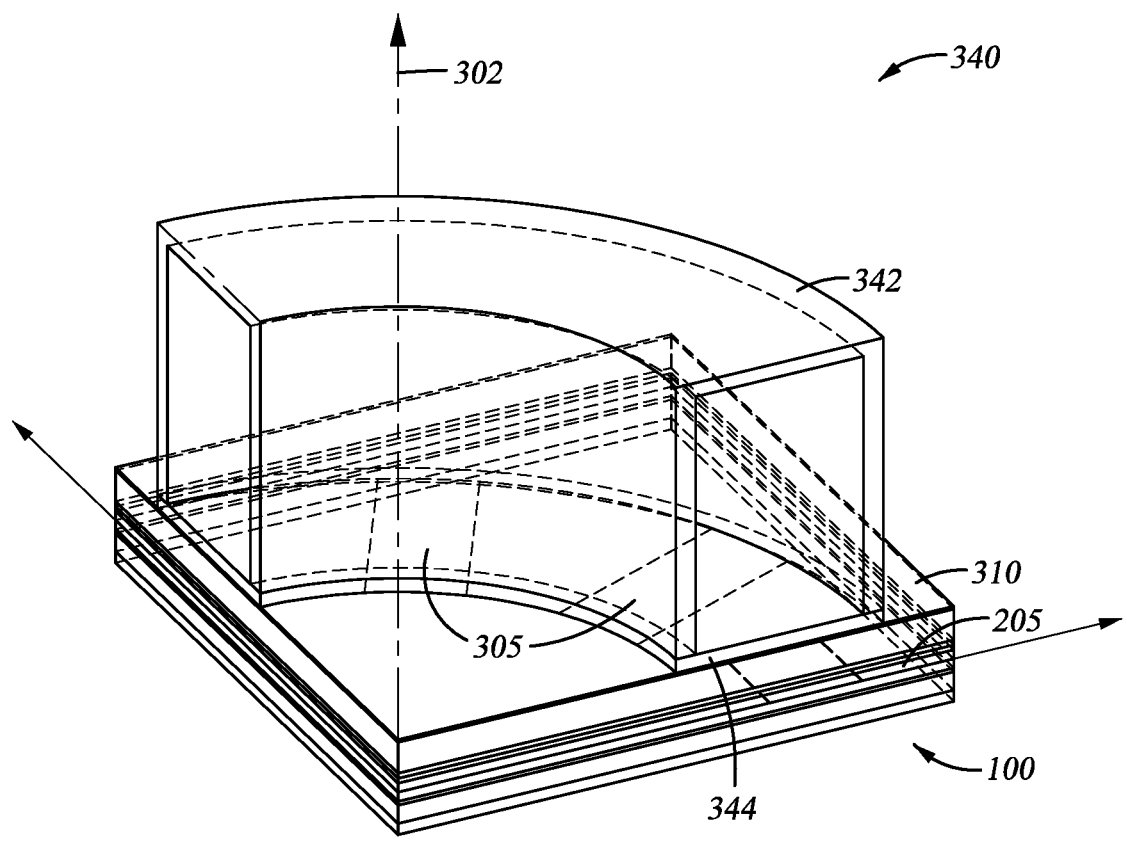
FIG. 3 illustrates an example rotatable input object, according to one or more embodiments.

FIG. 3 illustrates a portion of a rotatable input object 340 and the input device 100, according to one or more embodiments. The rotatable input object 340 may be a rotatable knob. Further, the rotatable input object 340 may comprise a cylinder 342 and electrodes 305. The cylinder 342 may comprise a conductive material and shield the electrodes 305 from the effects of a user's hand when the user's hand contacts the rotatable input object 340. Further, the cylinder 342 may shield the electrodes 305 from environmental effects external to the rotatable input object 340. The electrodes 305 are electrically coupled together. For example, the electrodes 305 are electrically coupled via one or more conductive connectors. In one embodiment, the rotatable input object 340 includes a base 344 coupled to a lens 310 of the input device 100. The lens 310 may be a lens or protective layer of a display device of the input device 100. In other embodiments, the rotatable input object 340 may omit the base 344. Further, the rotatable input object 340 may include one or more wheels or bearings that move along the base 344 or the surface of the input device 100 while the rotatable input object 340 is rotated. The rotatable input object 340 may be configured to rotate about axis 302 which is perpendicular to the surface of the input device 100. Rotating the rotatable input object 340 moves the electrodes 305 over the surface of the input device 100 and relative to the sensor electrodes 205. As the electrodes 305 are moved about the surface, the electrodes 305 alter the absolute capacitance of one or more of the sensor electrodes 205.

Figure 4:
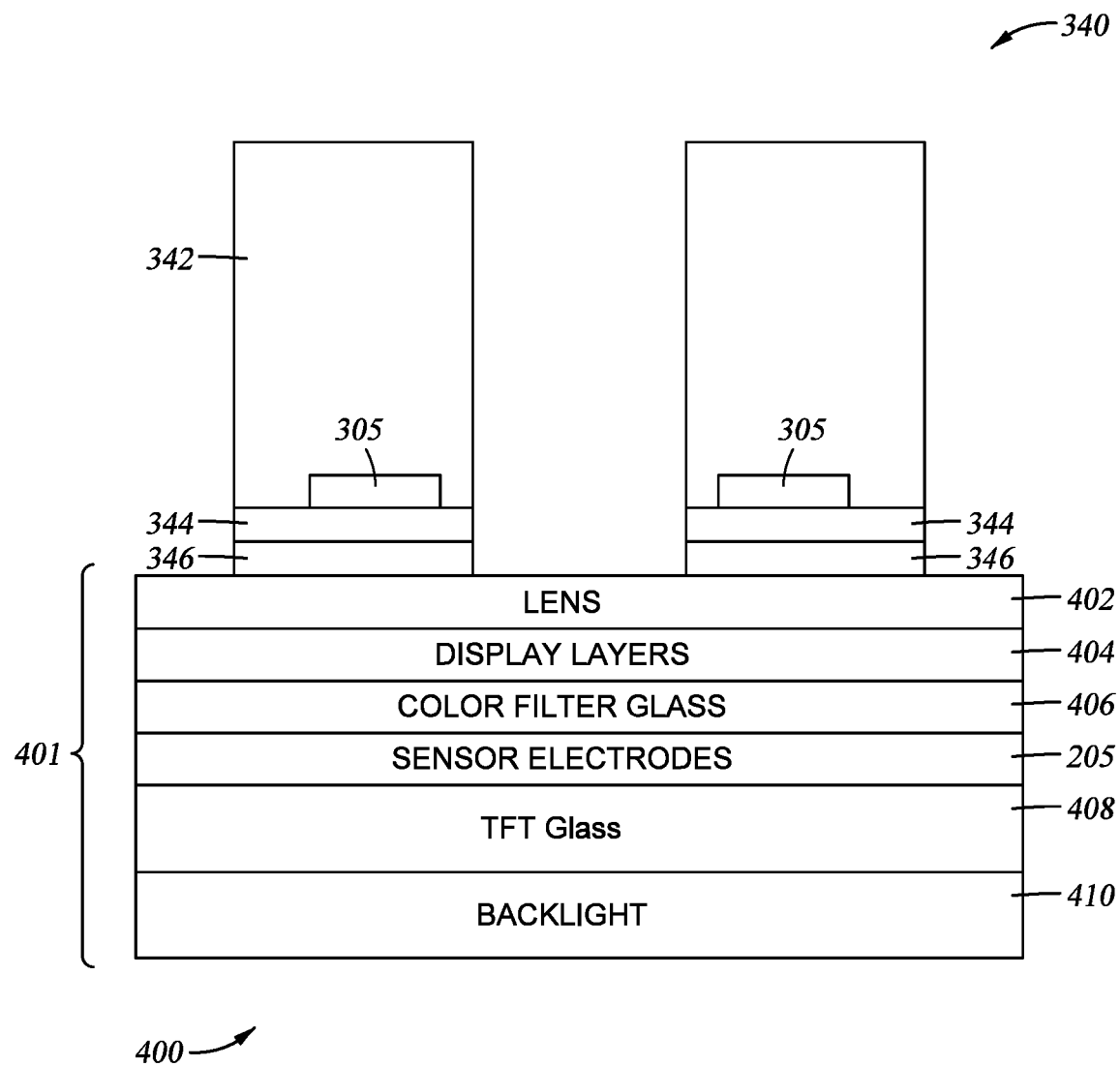
FIG. 4 is a schematic block diagram of an input device and rotatable input object, according to one or more embodiments.

FIG. 4 illustrates a schematic cross-section of the rotatable input object 340 and an input device 400, according to one or more embodiments. As illustrated, the input object 340 includes a display device 401. The display device 401 includes lens 402, display layers 404, color filter glass 406, sensor electrodes 205, thin-film transistor (TFT) glass 408, and backlight 410. The lens 402 may be an encapsulation layer of an OLED display device or a lens of an LCD device. The display layers 404 include one or more adhesive layers and/or one or more polarizers. In the embodiment of FIG. 4, the sensor electrodes 205 are configured to be driven for both capacitive sensing and display updating. For example, each of the sensor electrodes 205 may comprise on or more segments of a Vcom electrode or another display electrode. The TFT glass 408 includes a plurality of TFTs for updating the subpixels of the display device 401. Further, gate electrodes and source electrodes may be disposed in one or more layers of the TFT glass 408. While not illustrated, the display device 401 may additionally include pixel electrodes disposed between the TFT glass 408 and the color filter glass 406. The pixel electrodes are coupled to the gate electrodes and the source electrodes via the TFTs of the TFT glass 408. In embodiments where the display device 401 is an LCD device, the display device 401 additionally includes a liquid crystal material layer disposed between the TFT glass 408 and the color filter glass 406. In embodiments where the display device is an OLED display device, the display device 401 may include one or more organic layers disposed between the TFT glass 408 and the color filter glass 406. The backlight 410 may comprise one or more light emitting diodes (LEDs) or another light source and is configured to generate light for the display device 401. The base 344 of the rotatable input object 340 is adhered to the lens 402 through adhesive layer 346. Alternatively, the rotatable input object 340 may omit the base 344.

In one or more embodiments, the electrodes 305 are electrically floating such that the electrodes 305 are not actively driven with a voltage or current signal. Accordingly, the electrical potential of the electrodes 305 is based on the average electrical potential of the conductive objects proximate the electrodes 305. For example, the electrical potential of the electrodes 305 may be based on the electrical potential of one or more of the sensor electrodes 205. In one or more embodiments, the electrical potential of the electrodes 305 corresponds to the excitation state of the sensor electrode 205 capacitively coupled to the electrodes 305.

Figure 5:
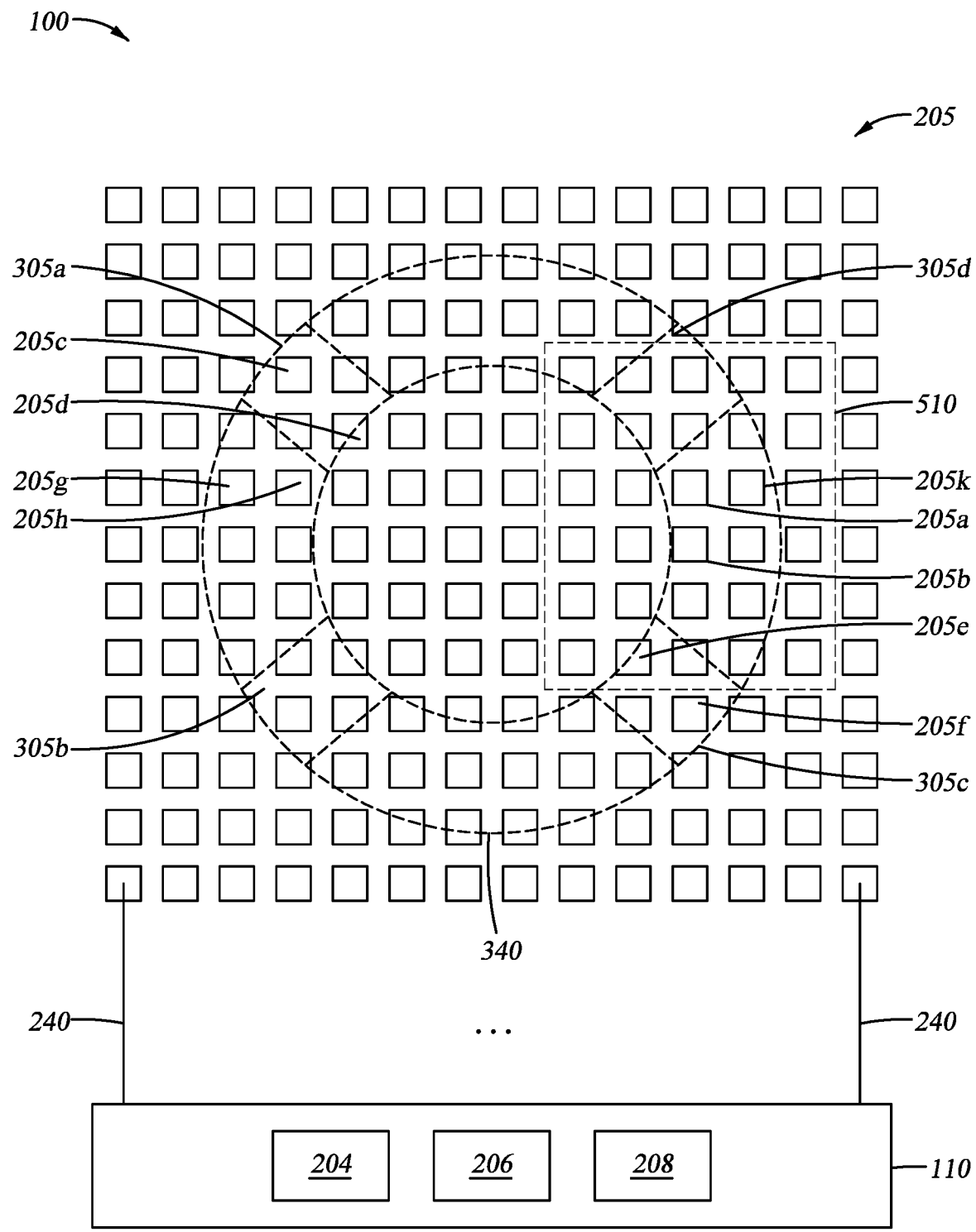
FIGS. 5 and 6 are schematic block diagrams of an input device, according to one or more embodiments.

FIG. 5 illustrates the rotatable input object 340 disposed over the sensor electrodes 205 of the input device 100. The rotatable input object 340 is shown as being transparent such that sensor electrodes 205 beneath the rotatable input object 340 are visible. The sensor module 204 operates the sensor electrodes 205 to acquire resulting signals that may be utilized to detect changes in absolute capacitance in response to movement of the electrodes 305 relative to the sensor electrodes 205. The sensor module 204 may drive two or more the sensor electrodes 205 (e.g., sensor electrodes 205a and 250b) with an absolute capacitive sensing signal and drive another one or more other sensor electrodes (e.g., the sensor electrodes 205c, 205d, 205e, and 205f) with a voltage reference Vref. Vref is a direct current (DC) voltage. In one embodiment, Vref is a ground voltage of the input device 100. In another embodiment, Vref is a DC voltage other than the ground voltage of the input device 100. In one or more embodiments, each of the sensor electrodes 205 other than the sensor electrodes 205a and 205b is driven with Vref while the sensor electrodes 205a and 205b are operated for absolute capacitive sensing.

Figure 6:
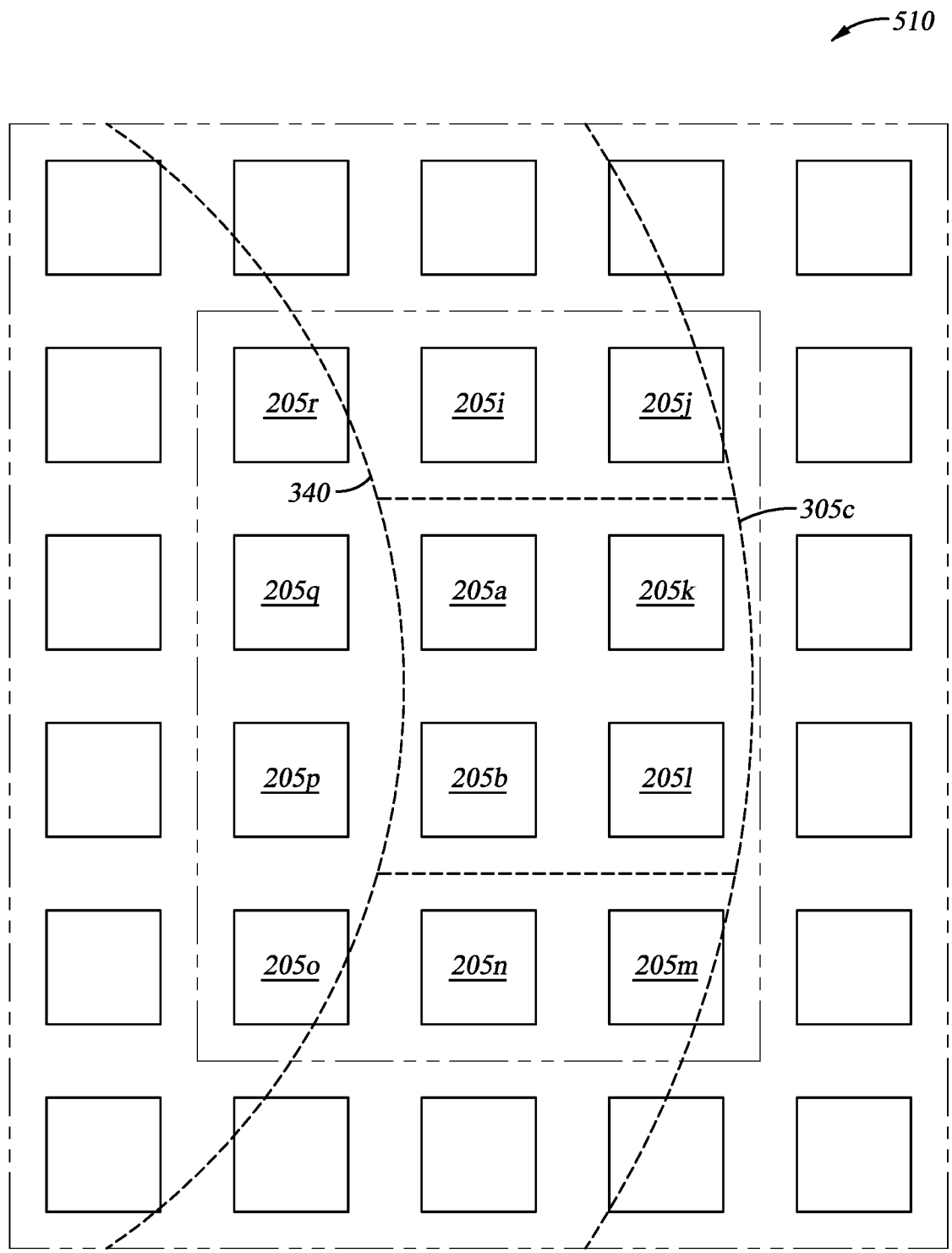
Figure 7:
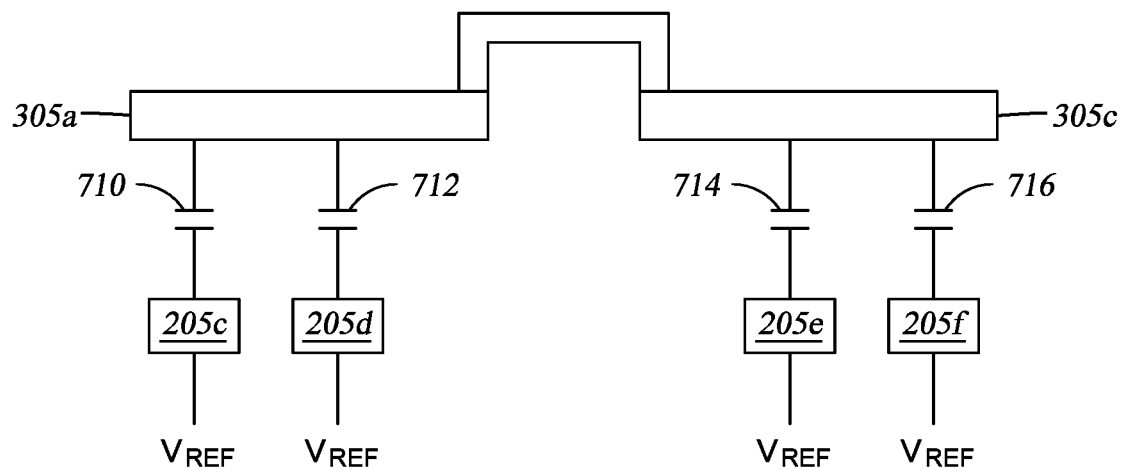
FIGS. 7 and 8 are schematic block diagrams of an input device and rotatable input object, according to one or more embodiments.

As the electrodes 305 are electrically floating, the electrical potential of the electrodes 305 is affected by the electrical potential of one or more of the sensor electrodes 205. For example, one or more of the electrodes 305 may be driven (e.g., indirectly) with Vref via a capacitive coupling formed between the electrodes 305 and one or more of the sensor electrodes 205 when one or more of the sensor electrodes 205 are driven with Vref. In one or more embodiments, FIG. 6 illustrates a portion 510 of the sensor electrodes 205 and the rotatable input object 340. For example, as illustrated in FIG. 6, the electrode 305c overlaps sensor electrodes 205a, 205b, 205k, and 205l. Further, as shown in FIG. 7, when the electrodes 305a and 305c are positioned over sensor electrodes 205c, 205d, 205e, and 205f, respectively, the electrodes 305a and 305c are driven with Vref via the capacitive couplings 710, 712, 714, and 716, respectively. Further, as each of the electrodes 305 are coupled to each other, the electrical potential of each of the electrodes 305 is based on an average potential of the sensor electrodes 205 coupling to the electrodes 305 Driving the electrodes 305 with Vref may mitigate the effects of external voltage sources on the electrodes 305. The external voltage sources are voltage sources external to the rotatable input object 340 and the input device 100.

In various embodiments, as the electrodes 305 are rotated over the sensor electrodes 205a and 205b, the electrodes 305 change the absolute capacitance of the sensor electrodes 205a and 205b. As discussed above, the sensor electrodes 205a and 205b are operated for absolute capacitive sensing, e.g., driven with an absolute capacitive sensing signal. FIGS. 5 and 6 illustrate a state where the rotatable input object 340 has been rotated such that the electrode 305c is positioned over the sensor electrodes 205a, 205b, 205k, and 205l while the electrode 305a is positioned over sensor electrodes 205g and 205h. Accordingly, the electrode 305a is capacitively coupled with the sensor electrode 205g via capacitance 810 and the sensor electrode 205h via capacitance 812 (shown in FIG. 8). Further, the electrode 305c is capacitively coupled to the sensor electrode 205a via capacitance 814 and the sensor electrode 205k via the capacitive coupling 816. Accordingly, as the electrodes 305a and 305c are electrically floating and are coupled together, the electrical potential of the electrodes 305a and 305c is influenced by Vref. Further, as the sensor electrode 205a is driven with the absolute capacitive sensing signal Vs, the electrical potential of the electrodes 305 will also be influenced by Vs, as the electrical potential of the electrode 305c is close to the potential of the absolute capacitive sensing signal Vs and the electrical potential of electrode 305a is close to Vref. According, as the electrodes 305 are electrically coupled together, the combined electrical potential of the electrodes 305 is between Vref and Vs. Further, in such an embodiment, the electrical potential of the electrodes is the average potential which exists in the direct vicinity of the entirety of the electrodes 305. In various embodiments, the excitation schemes utilized to drive the sensor electrodes 205 may be constructed such that the electrical potential of the electrodes 305 is close to Vref. For example, the excitation schemes may be constructed such that the electrical potential of the electrodes 305 is closer to Vref than Vs. In one embodiment, the electrical potential of the electrodes 305 is at least about 70 percent of Vref. For example, to ensure that the electrical potential of the electrodes 305 is close to Vref, the number of sensor electrodes 205 driven with the absolute capacitive sensing signal Vs should be limited such that the number of sensor electrodes 205 not driven with the absolute capacitive sensing signal Vs is greater than the number of the sensor electrodes 205 that are driven with the absolute capacitive sensing signal Vs. In one embodiment, no more than four sensor electrodes 205 are driven with the absolute capacitive sensing signal Vs. In other embodiments, no more than about 50 percent of sensor electrodes 205 are driven with the absolute capacitive sensing signal Vs. It is noted that the configurations of the electrodes 305 may also influence the electrical potential of the electrodes 305. For example, altering the number and/or size of the electrodes 305 may alter the electrical potential of the electrodes 305.

The change in the absolute capacitance of the sensor electrodes 205a and 205b may be utilized by the determination module 206 to determine rotational information for the rotatable input object 340. In various embodiments, the determination module 206 may determine a change in the position of the electrodes 305 relative to the two or more sensor electrodes 205 which are driven with the absolute capacitive sensing signal Vs.

Figure 8:
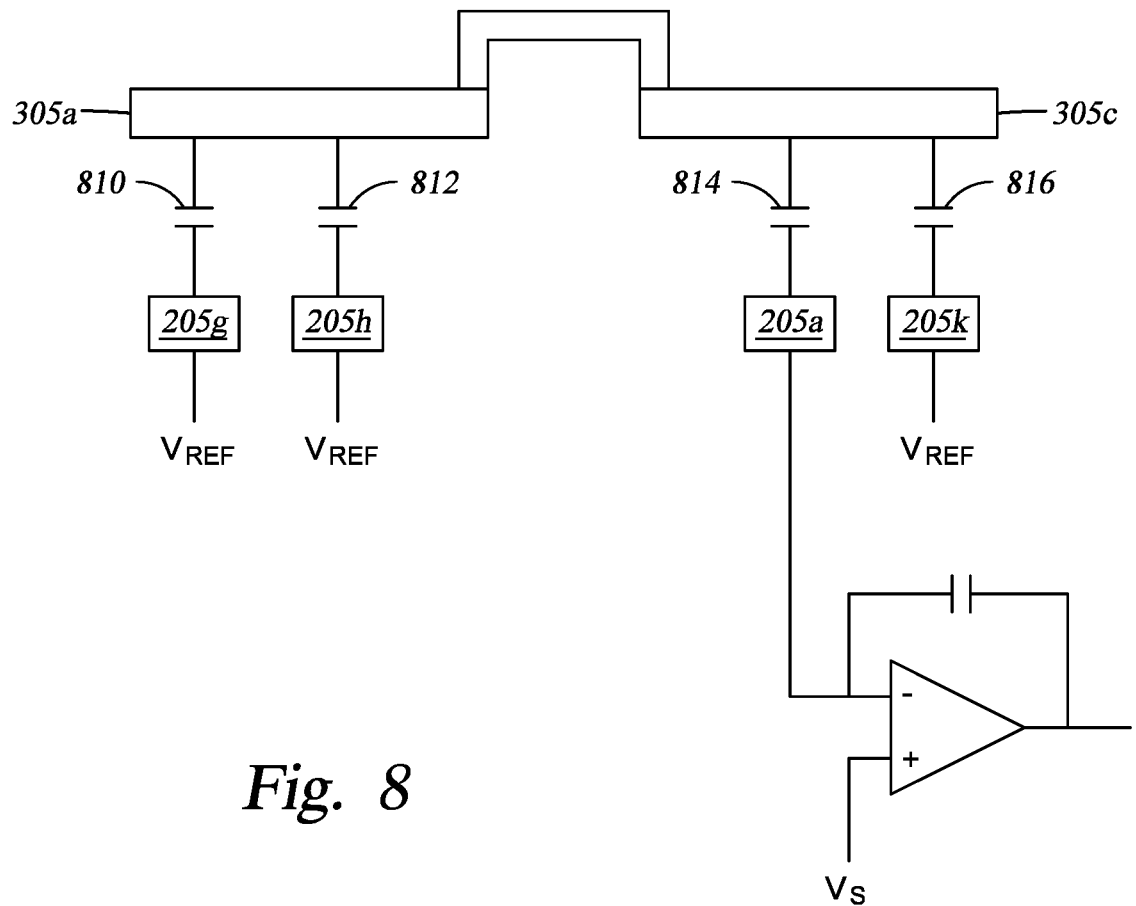

The electrical potential of the electrodes 305 may vary as the rotatable input object 340 is rotated. With reference to FIGS. 7 and 8, the electrical potential of electrodes 305a and 305c in the embodiment of FIG. 7 differs from the electrical potential of electrodes 305a and 305c in the embodiment of FIG. 8. The difference in electrical potential of the electrodes is due to that in the embodiment of FIG. 7, the electrode 305c is capacitively coupled to the sensor electrodes 205e and 205f which are driven by Vref and in the embodiment of FIG. 8, the electrode 305c is capacitively coupled to the sensor electrodes 205a and 205k which are driven with an absolute capacitive sensing signal Vs and Vref, respectively. Further, the resulting signal received by the sensor module 204 is based on the capacitance between the electrodes 305 and the sensor electrodes 205 driven for capacitive sensing and the voltage difference between the electrodes 305 and the sensor electrodes 205 driven for capacitive sensing. In one or more embodiment, the resulting signal received by the sensor module 204 is a result of the capacitance between the electrodes 305 and the sensor electrodes 205 driven for capacitive sensing and the voltage difference between the electrodes 305 and the sensor electrodes 205 driven for capacitive sensing. However, by electrically floating one or more the sensor electrodes adjacent to the sensor electrodes driven for absolute capacitive sensing, the variation of the electrical potential of the electrodes 305 as the rotatable input object 340 is rotated may be at least partially mitigated. Accordingly, the change in absolute capacitive sensing for the sensor electrode driven for absolute capacitive sensing due to the electrodes 305 is increased. In another embodiment, by driving one or more the sensor electrodes adjacent to the sensor electrodes driven for absolute capacitive sensing with a guard signal or absolute capacitive sensing signal, the variation of the electrical potential of the electrodes 305 as the rotatable input object 340 is rotated may be at least partially mitigated, increasing the change in absolute capacitive sensing caused by the electrodes 305. The guard signal may have one or more of a similar frequency, amplitude, and phase with the absolute capacitive sensing signal. Further, the waveform shape of the guard signal may be the same as the waveform shape of the absolute capacitive sensing signal.

Figure 9:
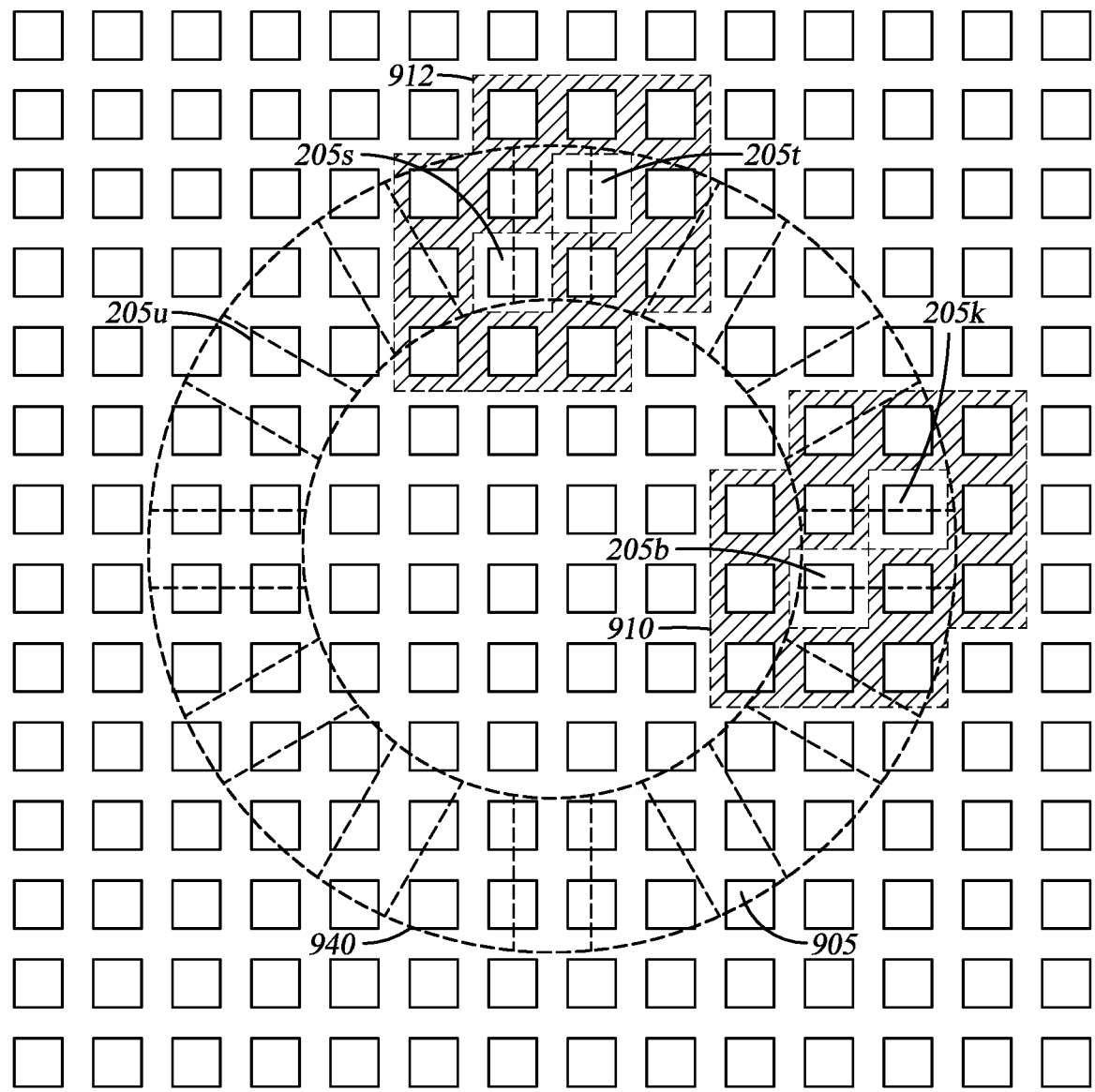
FIG. 9 is schematic block diagram of an input device, according to one or more embodiments.

FIG. 9 illustrates the sensor electrodes 205 and the rotatable input object 940, according to one or more embodiments. The rotatable input object 940 comprises electrodes 905 and is configured similar to that of the rotatable input object 340 of FIG. 3. The rotatable input object 940 is illustrated as being transparent such that the sensor electrodes 205 are visible. As compared to the embodiment of FIG. 5, the number of electrodes 905 is greater than the number of electrodes 305. Alternatively, the number of electrodes 905 may be the same as or less than the number of electrodes 305. In one embodiment, the size of the electrodes 905 may be smaller than that of the electrodes 305. In other embodiments, the size of the electrodes 905 is the same as or larger than that of the electrodes 305. The sensor electrodes 205b, 205k, 205s, and 205t are operated for absolute capacitive sensing by the sensor module 204. Further, the rest of the electrodes of regions 910 and 912 may be electrically floated, driven with a guard signal, driven with an absolute capacitive sensing signal, driven with Vref, or a combination thereof. Further, one or more (or all) of the other sensor electrodes 205 outside that of regions 910 and 912 are driven with Vref when the sensor electrodes 205b, 205k, 205s, and 205t are operated for absolute capacitive sensing.

Figure 10:
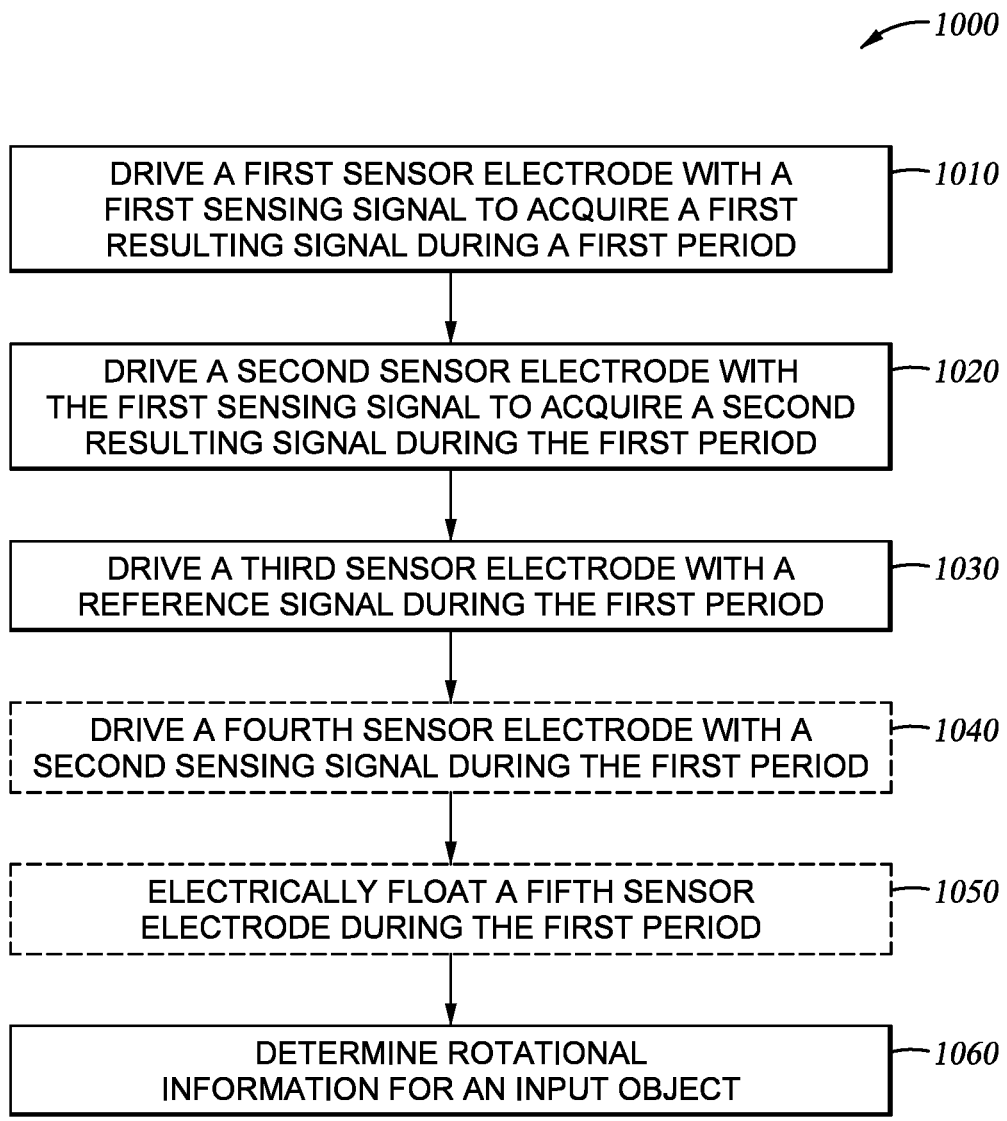
FIG. 10 is a flowchart illustrating a method for operating a sensing device, according to one or more embodiments.

FIG. 10 illustrates flowchart of a method 1000 for operating an input device, e.g., the input device 100, according to one or more embodiments. At operation 1010, a first sensor electrode is driven with a first sensing signal to acquire a first resulting signal during a first period. For example, with reference to FIG. 6, the sensor module 204 drives the sensor electrode 205a with an absolute capacitive sensing signal to acquire a corresponding resulting signal during the first period. The resulting signal comprises effects corresponding to a position of the electrodes 305 relative to the sensor electrode 205a. With reference to FIG. 9, the sensor module 204 drives at least one of the sensor electrodes 205k and 205t with an absolute capacitive sensing signal to acquire a respective resulting signal from each of the sensor electrodes 205k and 205t during the first period. The resulting signals comprise effects corresponding to a position of the electrodes 305 relative to the sensor electrodes 205k and 205t.

At operation 1020, a second sensor electrode is driven with the first sensing signal to acquire a second resulting signal during the first period. For example, with reference to FIG. 6, the sensor module 204 drives the sensor electrode 205b with an absolute capacitive sensing signal to acquire a corresponding resulting signal during the first period. The resulting signal may comprise effects corresponding to a position of the electrodes 305 relative to the sensor electrode 205b. The resulting signal comprises effects corresponding to a position of the electrodes 305 relative to the sensor electrode 205b. With reference to FIG. 9, the sensor module 204 drives at least one of the sensor electrodes 205b and 205s with an absolute capacitive sensing signal to acquire a respective resulting signal from each of the sensor electrodes 205k and 205t during the first period. The resulting signals comprise effects corresponding to a position of the electrodes 305 relative to the sensor electrodes 205b and 205s.

With reference to FIG. 6, the sensor module 204 drives the sensor electrodes 205a and 205b simultaneously with an absolute capacitive sensing signal to receive a respective resulting signal from each of the sensor electrodes 205a and 205b during the first period. With reference to FIG. 9, during operations 1010 and 1020, the sensor module 204 drives the sensor electrodes 205b, 205k, 205s, and 205t simultaneously with an absolute capacitive sensing signal to receive a respective resulting signal from each of the sensor electrodes 205b, 205k, 205s, and 205t during the first period.

At operation 1030, a third sensor electrode is driven with a reference signal during the first period. For example, with reference to FIG. 5, the sensor module 204 drives the sensor electrode 205c with Vref during the first period. Further, the sensor module 204 may drive additional ones of the sensor electrode 205 with Vref during the first period. For example, in one embodiment, the sensor electrodes 205 excluding the sensor electrodes 205i-205r as indicated in FIG. 6 may be driven with a ground signal. In other embodiments, each of the sensor electrodes 205 proximate the input object 340 and excluding the sensor electrodes 205a and 205b may be driven with Vref. In other embodiments, with reference to FIG. 9, the sensor electrodes 205 excluding those in regions 910 and 912 are driven with Vref during the first period. In various embodiments, with reference to FIG. 9, the sensor electrodes 205 excluding the sensor electrodes 205b, 205k, 205s, and 205t are driven with Vref during the first period.

With reference to FIG. 5, the sensor module 204 simultaneously drives the sensor electrodes 205a and 205b with an absolute capacitive sensing signal and the sensor electrode 205c with Vref during the first period. Further, in other embodiments and with reference to FIG. 9, the sensor module 204 simultaneously drives the sensor electrodes 205b, 205k, 205s, and 205t with an absolute capacitive sensing signal and a sensor electrode 205u with Vref.

In response to driving one or more of the sensor electrodes 205 with Vref, one or more of the electrodes 305 are driven with Vref via capacitances formed between the sensor electrodes 205 and the electrodes 305. For example, with reference to FIG. 7, in response to driving the sensor electrodes 205c, 205d, 205e, and 205f with Vref, the electrodes 305a and 305c are driven with Vref via capacitive couplings 710, 712, 714, and 716, respectively.

At operation 1040, a fourth sensor electrode is electrically floated during the first period. For example, with reference to FIGS. 5 and 6, one or more sensor electrodes adjacent to the sensor electrode 205a and/or the sensor electrode 205b are electrically floated by the sensor module 204 during the first period. Further, the operations 1010, 1020, 1030, and 1040 can occur simultaneously. For example, the sensor module 204 electrically floats the fourth sensor electrode, simultaneously with driving the first and second sensor electrodes with sensing signal and driving the third electrode with the reference signal. In other embodiments, the operations 1010, 1020, 1030, and 1040 may occur in parallel with each other or sequentially. Further, the operations 1010, 1020, 1030, and 1040 may occur in any order. In various embodiments, the operation 1040 is optional.

Electrically floating may comprise decoupling or disconnecting a sensor electrode 205 from the sensor module 204. Further, electrically floating may comprise placing a sensor electrode 205 in a high impedance state.

In one or more embodiments, one or more of the sensor electrodes 205i-205r in FIG. 6 are electrically floated during the first period. In other embodiments, the sensor electrodes 205i-205r are electrically floated during the first period. For example, all of the sensor electrodes 205i-205r may be electrically floated during the first period. In various embodiments, a sensor electrode in a common row with that of either sensor electrode 205a or 205b is electrically floated during the first period. For example, the sensor electrode 205q, which is in a common row with the sensor electrode 205a, is electrically floated. Further, the sensor electrode 205k, which is in a common row with the sensor electrode 205a, is electrically floated. Additionally, the sensor electrode 205p, which is in a common row with the sensor electrode 205b, is electrically floated. Further, the sensor electrode 205l, which is in a common row with the sensor electrode 205b, is electrically floated. Additionally, or alternatively, a sensor electrode in a common row with that of the sensor electrode 205a and/or the sensor electrode 205b is electrically floated during the first period. For example, the sensor electrode 205i, which is in a common row with sensor electrodes 205a and 205b is electrically floated. Further, the sensor electrode 205n, which is in a common row with sensor electrodes 205a and 205b is electrically floated. Additionally, or alternatively, the sensor electrodes 205r, 205o, 205j, and/or 205m may be guarded.

With reference to FIG. 9, the operation 1040 comprises electrically floating one or more of the sensor electrodes within regions 910 and 912 during the first period. For example, one or more of the sensor electrodes within regions 910 and 912 and adjacent to one or more of the sensor electrodes 205b, 205k, 205s, and 205t is electrically floated during the first period. Further, one or more of the sensor electrodes within regions 910 and 912, in a common row with one or more of the sensor electrodes 205b, 205k, 205t, and 205s, and adjacent to one or more of the sensor electrodes 205b, 205k, 205t, and 205s is electrically floated during the first period. Additionally, or alternatively, one or more of the sensor electrodes within regions 910 and 912 in a common column with one or more of the sensor electrodes 205b, 205k, 205t, and 205s, and adjacent to one or more of the sensor electrodes 205b, 205k, 205t, and 205s is electrically floated during the first period. In other embodiments, one or more of the sensor electrodes in regions 910 and 912 may be floated, guarded and/or driven with Vref.

During operation 1050, with reference to FIG. 6, the sensor module 204 drives one or more of the sensor electrodes 205i-205r with a second sensing signal. In one embodiment, driving one or more of the sensor electrodes 205i-205r with a second sensing signal comprises driving one or more of the second sensor electrodes 205i-205r with one of a guard signal and an absolute capacitive sensing signal. Further, the sensor module 204 drives a sensor electrode adjacent to the sensor electrodes 205a and/or drives a sensor electrode adjacent to the sensor electrode 205b with the second sensing signal. For example, an adjacent sensor electrode is a sensor electrode that is in a common row and/or column with sensor electrode 205a or the sensor electrode 205b. For example, with reference to FIG. 6, the sensor module 204 drives one or more of the sensor electrodes 205q, 205k, and 205i, which are adjacent to the sensor electrode 205a, with the second sensing signal, during the first period. Additionally, or alternatively, during the first period, the sensor module 204 drives one or more of the sensor electrodes 205p, 205l, and 205n, which are adjacent to the sensor electrode 205b, with the second sensing signal.

With reference to FIG. 9, at operation 1050 the sensor module 204 drives one or more of the sensor electrodes in region 910 and/or region 912 with a second sensing sign during the first period. Further, the sensor module 204 the sensor module 204 drives the entirety of the sensor electrodes in region 910 and/or region 912 with a second sensing sign during the first period.

The operation 1050 may occur simultaneously with the operations 1010, 1020, and 1030. For example, the sensor module 204 may simultaneously drive the first sensor electrode and the second sensor electrode with the first sensing signal, drive the third sensor electrode with the reference signal and drive the fourth sensor electrode with the second sensing signal.

In various embodiments, the operation 1050 is optional. For example, in one or more embodiments, the method 1000 omits the operation 1050. Alternatively, in one embodiment, the method 1000 includes the operation 1050.

At operation 1060, rotational information for an input object is determined. For example, the determination module 206 receives the resulting signals received by the sensor module 204 during operations 1010 and 1020. Further, the determination module 206 processes the resulting signals to determine a change in capacitive coupling for one or more of the sensor electrodes 205a, 205b, 205k, 205s, and 205t. For example, the determination module 206 may baseline the resulting signals. Baselining the resulting signals may comprise removing baseline measurements from the resulting signals. In one embodiment, the determination module 206 determines a measurement of a change in capacitance for each of the sensor electrodes 205a and 205b from the processed resulting signals. In another embodiment, the determination module 206 determines a measurement of a change in capacitance for each of the sensor electrodes 205b, 205k, 205t, and 205s from the processed resulting signals.

The determination module 206 further determines rotational information of the rotatable input object 340 from the change in capacitance for the sensor electrodes 205a, 205b, 205k, 205t, and 205s. The change in capacitance for the sensor electrodes 205a, 205b, 205k, 205t, and 205s may be calculated, determined, and measured by the determination module 206. Rotational information comprises one or more of an amount of rotation and a direction of rotation. In one embodiment, the determination module 206 may compare the change in capacitance of the sensor electrode 205a to the change in capacitance of the sensor electrode 205b to determine one or more of a direction of rotation and an amount of rotation of the rotatable input object 340. Further, in another embodiment, the determination module 206 may compare the change in capacitance of the sensor electrode 205*b* to the change in capacitance of the sensor electrode 205*s* and the change in capacitance of the sensor electrode 205*k* to the change in capacitance of the sensor electrode 205*t* to determine one or more of a direction of rotation and an amount of rotation of the rotatable input object 340.

In various embodiments, during operation 1050 the sensor module 204 is further configured to receive a resulting signal from the fourth sensor electrode driven with the second sensing signal. For example, with reference to FIG. 6, the sensor module 204 receives a resulting signal from one or more of the sensor electrodes 205*i*-205*r* in response to driving the one or more sensor electrodes 205*i*-205*r* with an absolute capacitive sensing signal. With reference to FIG. 9, the sensor module 204 receives a resulting signal from one or more of the sensor electrodes in region 910 and/or 912 in response to driving the sensor electrode or sensor electrodes with an absolute capacitive sensing signal. Further, the determination module 206 may determine the rotational information for the rotatable input object 340 further based on the resulting signals received from one or more of the sensor electrodes 205*i*-205*r* and/or the sensor electrodes of the regions 910 and/or 912. The resulting signals may be processed similar to that processing resulting signals received from sensor electrodes 205*a* and 205*b*.

Thus, the embodiments and examples set forth herein were presented to explain the present technology and applications and to enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A processing system, comprising:
   a sensor module comprising sensor circuitry and coupled to a plurality of sensor electrodes, the sensor module configured to:
   drive a first sensor electrode of the plurality of sensor electrodes with a first sensing signal to acquire a first resulting signal with the first sensor electrode during a period;
   drive a second sensor electrode of the plurality of sensor electrodes with the first sensing signal to acquire a second resulting signal with the second sensor electrode during the period; and
   drive a third sensor electrode of the plurality of sensor electrodes with a reference signal during the period; and
   electrically float fourth and fifth sensor electrodes of the plurality of sensor electrodes during the period or drive the fourth and fifth sensor electrodes of the plurality of sensor electrodes with a second sensing signal during the period, wherein the fourth sensor electrode is disposed adjacent to and in a common row with the first sensor electrode, and the fifth sensor electrode is disposed adjacent to and in a common row with the second sensor electrode; and
   a determination module configured to determine rotational information for an input object at least partially based on the first resulting signal and the second resulting signal.

2. The processing system of claim 1, wherein the fourth sensor electrode and the fifth sensor electrode are disposed in a common column.

3. The processing system of claim 1, wherein the sensor module is further configured to:
   electrically float a sixth sensor electrode of the plurality of sensor electrodes and a seventh sensor electrode of the plurality of sensor electrodes during the period, wherein the sixth sensor electrode is disposed adjacent to and in a common row with the first sensor electrode, and the seventh sensor electrode is disposed adjacent to and in a common row with the second sensor electrode.

4. The processing system of claim 1, wherein the second sensing signal is a guard signal having at least one of a frequency, amplitude, and phase in common with the first sensing signal.

5. The processing system of claim 1, wherein the sensor module is configured to acquire a third resulting signal from the fourth sensor electrode and a fourth resulting signal from the fifth sensor electrode in response to driving the fourth sensor electrode and the fifth sensor electrode with the second sensing signal.

6. The processing system of claim 1, wherein the sensor module is further configured to electrically float a sixth sensor electrode of the plurality of sensor electrodes, wherein the sixth sensor electrode is adjacent to one of the fourth sensor electrode and the fifth sensor electrode.

7. An input device, comprising:
   a plurality of sensor electrodes; and
   a processing system coupled to the plurality of sensor electrodes and configured to:
   drive a first sensor electrode of the plurality of sensor electrodes with a first sensing signal to acquire a first resulting signal with the first sensor electrode during a period;
   drive a second sensor electrode of the plurality of sensor electrodes with the first sensing signal to acquire a second resulting signal with the second sensor electrode during the period;
   drive a third sensor electrode of the plurality of sensor electrodes with a reference signal during the period;
   drive fourth and fifth sensor electrodes of the plurality of sensor electrodes with a second sensing signal during the period, wherein the fourth sensor electrode is disposed adjacent to and in a common row with the first sensor electrode, and the fifth sensor electrode is disposed adjacent to and in a common row with the second sensor electrode; and
   determine rotational information for an input object at least partially based on the first resulting signal and the second resulting signal.

8. The input device of claim 7, wherein the processing system is further configured to electrically float a sixth sensor electrode of the plurality of sensor electrodes, wherein the sixth sensor electrode is adjacent to one of the fourth sensor electrode and the fifth sensor electrode.

9. The input device of claim 7, wherein the processing system is configured to drive a region of sensor electrodes of the plurality of sensor electrodes with the second sensing signal, wherein the second sensing signal is a guard signal, and wherein the region is made up of all sensor electrodes which are adjacent to the first sensor electrode or adjacent to the second sensor electrode, including the fourth and fifth sensor electrodes but not including the first and second sensor electrodes.

10. The input device of claim 9, wherein the processing system is configured to drive multiple sensor electrodes outside of the region with the reference signal, wherein the multiple sensor electrodes outside of the region include the third sensor electrode.

11. The input device of claim 10, wherein driving the multiple sensor electrodes outside of the region with the reference signal corresponds to grounding the multiple sensor electrodes outside of the region.

12. The input device of claim 7, wherein the input object is a rotatable knob having one or more electrodes.

13. The input device of claim 12, wherein the determined rotational information corresponds to a change in position of the one or more electrodes of the rotatable knob.

14. An input device, comprising:
a plurality of sensor electrodes; and
a processing system coupled to the plurality of sensor electrodes and configured to:
drive a first sensor electrode of the plurality of sensor electrodes with a first sensing signal to acquire a first resulting signal with the first sensor electrode during a period;
drive a second sensor electrode of the plurality of sensor electrodes with the first sensing signal to acquire a second resulting signal with the second sensor electrode during the period;
drive a third sensor electrode of the plurality of sensor electrodes with a reference signal during the period;
electrically float fourth and fifth sensor electrodes of the plurality of sensor electrodes during the period, wherein the fourth sensor electrode is disposed adjacent to and in a common row with the first sensor electrode, and the fifth sensor electrode is disposed adjacent to and in a common row with the second sensor electrode; and
determine rotational information for an input object at least partially based on the first resulting signal and the second resulting signal.

15. The input device of claim 14, wherein the processing system is further configured to:
electrically float a sixth sensor electrode of the plurality of sensor electrodes and a seventh sensor electrode of the plurality of sensor electrodes during the period, wherein the sixth sensor electrode is disposed adjacent to and in a common row with the first sensor electrode, and the seventh sensor electrode is disposed adjacent to and in a common row with the second sensor electrode.

16. The input device of claim 14, wherein the processing system is configured to electrically float a region of sensor electrodes of the plurality of electrodes, wherein the region is made up of all sensor electrodes which are adjacent to the first sensor electrode or adjacent to the second sensor electrode, including the fourth and fifth sensor electrodes but not including the first and second sensor electrodes.

17. The input device of claim 16, wherein the processing system is configured to drive multiple sensor electrodes outside of the region with the reference signal, wherein the multiple sensor electrodes outside of the region include the third sensor electrode.

18. The input device of claim 17, wherein driving the multiple sensor electrodes outside of the region with the reference signal corresponds to grounding the multiple sensor electrodes outside of the region.

19. The input device of claim 14, wherein the input object is a rotatable knob having one or more electrodes, and wherein the determined rotational information corresponds to a change in position of the one or more electrodes of the rotatable knob.

20. The processing system of claim 1, wherein the third sensor electrode is capacitively coupled with an electrode of the input object.

* * * * *